(12) United States Patent
Campbell et al.

(10) Patent No.: US 8,311,906 B1
(45) Date of Patent: Nov. 13, 2012

(54) COMPUTERIZED SYSTEM AND METHOD FOR MANAGING PARTS SHORTAGES

(75) Inventors: John Campbell, East Liberty, OH (US); Hiroshi Kawaguchi, Indianapolis, IN (US); Joseph Lewis, Indianapolis, IN (US); Masahiko Minamikawa, Columbus, IN (US); Steven Swank, Lawrenceburg, IN (US); Toshihide Tanaka, Indianapolis, IN (US)

(73) Assignees: Honda Motor Co., Ltd., Tokyo (JP); Midwest Express Inc., East Liberty, OH (US)

( * ) Notice: Subject to any disclaimer, the term of this patent is extended or adjusted under 35 U.S.C. 154(b) by 387 days.

(21) Appl. No.: 12/569,658

(22) Filed: Sep. 29, 2009

Related U.S. Application Data (63) Continuation-in-part of application No. 12/240,852, filed on Sep. 29, 2008, now Pat. No. 8,010,220.

(60) Provisional application No. 61/101,102, filed on Sep. 29, 2008.

(51) Int. Cl.
*G06Q 10/00* (2006.01)

(52) U.S. Cl. .............. 705/28; 705/7; 705/26; 705/14; 705/15; 705/22; 705/29; 705/13; 705/37; 700/96; 700/97; 700/99; 700/100; 700/106; 700/101; 700/95; 700/115; 235/382; 235/383; 235/385; 235/376

(58) Field of Classification Search ............... 705/28
See application file for complete search history.

(56) References Cited

U.S. PATENT DOCUMENTS

| | | | |
|---|---|---|---|
| 4,683,540 A | 7/1987 | Kurosu et al. | |
| 5,528,489 A | 6/1996 | Asahara et al. | |
| 5,953,707 A * | 9/1999 | Huang et al. | 705/7.25 |
| 6,141,598 A | 10/2000 | Nam | |
| 6,698,655 B2 | 3/2004 | Kondo et al. | |
| 6,705,523 B1 | 3/2004 | Stamm et al. | |
| 6,813,539 B2 | 11/2004 | Morimoto et al. | |
| 6,993,421 B2 * | 1/2006 | Pillar et al. | 701/29.4 |
| 7,010,373 B2 | 3/2006 | Fukushima et al. | |
| 2002/0019761 A1 * | 2/2002 | Lidow | 705/10 |
| 2005/0080520 A1 * | 4/2005 | Kline et al. | 701/1 |
| 2006/0074778 A1 | 4/2006 | Katou et al. | |
| 2007/0187183 A1 * | 8/2007 | Saigh et al. | 186/53 |
| 2007/0228142 A1 | 10/2007 | Yamaguchi | |
| 2009/0082902 A1 * | 3/2009 | Foltz et al. | 700/214 |

OTHER PUBLICATIONS

Caputo, Antonio C Pelagagge, Pacifico M. Management criteria of automated order picking systems in high-rotation high-volume distribution centers. Industrial Management + Data Systems, 2006, v106n9, p. 1359-1383.*

* cited by examiner

*Primary Examiner* — F. Ryan Zeender
*Assistant Examiner* — Fawaad Haider
(74) *Attorney, Agent, or Firm* — Standley Law Group LLP

(57) ABSTRACT

A computerized system and method for managing parts shortages is disclosed. The computerized system and method analyzes inventory and production demand data over a period of time to whether the parts in inventory are sufficient to meet production demand. The projections allow a logistics provider to determine when parts shortages are likely to occur and the nature of the potential shortages. Information about the type and time of potential parts shortages allow the logistics provider to take action to prevent shortages entirely or minimize their impact on production. Some shortages may be covered by requesting delivery of parts from various locations within the site inventory or by locating parts within the site inventory. Other shortages may be covered by ordering more parts from suppliers. The ability to detect various types of shortages and take mitigating actions allow a logistics provider to maintain a flow of parts to production.

20 Claims, 6 Drawing Sheets

FIG-1

160 — Ctrl #: P 99991

162 — Part #: D0XX4
Part Name: Door Handle
Supplier #: 99999994
Supplier Name: JKL Supply
MCID: XXXXXXX 164 — Qty   Code   Lot
30     X      200901

Potential Short Parts     06/25/2009  10:41
                Wh/ Co/ Dv:  AAA BBB ABCDEFG
Critical Pick Time: 12:12     Area: XYZ Color: CC102

Location        Qty
            Trailer B303    −60
            Trailer C101    −60
            Overstock 101   −30

168 — Inventory Summary:
Yard                  :  120
In-house Netable      :   60
In-house Non-Netable  :   30

Critical Parts Information Short Sheet   06/25/2009   11:40
Wh/ Co/ Div: AA/CO/ENG

170 —
Ctrl #: T999991              Train Depart CST: 1:30
Area:   Overstock A 101
Part #: DOXX4                Color: CC102
Part Name: Door Handle
Supplier #: 99999994
Supplier Name: JKL Supply
MCID:

172 —
| Qty | Code | Lot | Train | CML | Del Location |
|---|---|---|---|---|---|
| 30 | POA123 | 2009001 | CID 25 | 3A | AF 204 |

174 —
| Location | Qty |
|---|---|
| Trailer B303 | 60 |
| Trailer C101 | 60 |
| Overstock A 101 | 30 |

176 —
Inventory Summary
Yard                          120
In-house Netable:              60
In-house Non-netable:          30

178 —
Production System Inventory: ________
AYD01/CP01:                    ________
AWH01/CP01:                    ________
BWH01/CP01:                    ________
BSG01/MS01:                    ________
BCG01/MS01:                    ________
BCG02/MS02:                    ________

180 —
Issuer: J. Associate
Status: ________________________
Short Parts Associate: ________________

FIG-4A

```
              CUXXX3PR    Critical Parts Information Cycle Count  06/25/2009   11:40
                                                          Wh/ Co/ Div: AA/CO/ENG Area:   Overstock A 101

190 ─     Control #:  T999991

Train Dispatch Date / CST:   06/25/2009   1:30

192 ─     ||||||||||||||        Part #:           Color:
                                DOXX4             CC102

Missing LSNs         Qty            Location
194 ─     XXXXXXXXXXXX          30            XXXXXXXX
          XXXXXXXXXXXX          30            XXXXXXXX
          XXXXXXXXXXXX          30            XXXXXXXX Location      Cntr Qty       Location Qty

COMPUTERIZED SYSTEM AND METHOD FOR MANAGING PARTS SHORTAGES

CROSS-REFERENCE TO RELATED APPLICATIONS

This application is a continuation-in-part of U.S. patent application Ser. No. 12/240,852, filed Sep. 29, 2008, and titled SYNCHRONOUS AND OPTIMUM LINE DELIVERY UTILIZING TACT INFORMATION, which is incorporated herein by reference. This application claims priority to U.S. Provisional Patent Application No. 61/101,102, filed Sep. 29, 2008, and titled LOGISTICS PROVIDER PARTS DELIVERY AND MANAGEMENT SYSTEM, which is incorporated herein by reference.

FIELD OF THE INVENTION

The present invention relates to parts delivery management for assembly plants. More particularly, a computerized system and method is disclosed for identifying and managing parts shortages that may occur for different reasons.

BACKGROUND OF THE INVENTION

To keep production lines moving, manufacturers require delivery of the right part to the right place at the right time and in the right quantity. In conventional production lines such as automotive assembly lines, parts are added or assembled to a partially assembled product as it passes by assembly stations or areas on the production line. Associates working on the production line install parts and complete assembly processes as may be required to build a product meeting a particular set of specifications. A production schedule usually determines which manufacturer products will be built on a particular day or other production period and therefore, dictates which parts or components are needed on the production line so associates can complete the installation and assembly tasks at the assembly stations or areas. If an associate at an assembly station does not have the right parts at the right time, accommodations to the production process must be made. The product may be held or diverted to another location while attempts are made to locate the appropriate parts. Production slows or worse, may be halted entirely, as time is spent locating the appropriate part or parts to complete the necessary installation and assembly tasks.

To facilitate delivery of parts to the production line, some manufacturers work with a logistics provider that manages inventories of parts at the manufacturing facility and uses a variety of delivery techniques get parts from various inventory locations to production line locations when a need for replenishment is determined. For example, when the line side supply of a particular part at a particular location drops below a threshold, a replenishment method may be used in which an associate drives a vehicle loaded with the low inventory part to the particular production line location. Other manufacturers respond to replenishment requests using automated guided vehicles that deliver parts to assembly line locations based on directional information programmed into the vehicles.

Various right part, right place, right time (RPT) production methods have been developed to reduce costs attributable to maintaining replenishment inventories. RPT techniques involve coordinating the delivery of parts to the manufacturer's assembly plant as well as to "line side" locations in an effort to reduce inventory levels and, consequently, costs. Some manufacturers have incorporated parts consolidation centers into their RPT practices. Consolidation centers are facilities where parts are received from suppliers, staged for use in one or more assembly plants (i.e., organized according to the order in which they will be consumed), and then transported from the consolidation center to an assembly plant production line where they are consumed.

Although the logistics provider is responsible for delivery of parts from their arrival at the consolidation center to production line locations, the manufacturer typically orders the parts and supplies that are delivered to the consolidation center. The manufacturer orders parts and schedules delivery of the parts from suppliers as needed to maintain a flow of parts from the consolidation center to the production line. Although parts are ordered and scheduled for delivery according to the manufacturer's needs, what is delivered to the consolidation center and when it is delivered may be different than what was ordered for a variety of reasons. In some instances, parts deliveries to the consolidation center may be delayed due to weather, traffic, or even a wrong turn while en route to the consolidation center. In other instances, the supplier may not have provided all of the parts that were ordered. The parts may not have been loaded on the truck or they may not have been manufactured at all. Once at the consolidation center, parts may be misplaced during unloading or transportation to various points within the facility.

Part shortages attributable to delivery delays, quantity variances, misplacement, etc. may occur for various reasons. Although a logistics provider may undertake efforts to prevent or mitigate the impact of a parts shortage on production, the options available to the logistics provider depend upon a variety of factors. Some parts shortages may be corrected easily by locating the parts in overstock inventory or other inventory locations at the consolidation center. If the parts are not available in inventory, parts shipment data allows the logistics provider to determine whether an incoming shipment may be used to address the parts shortage. If no incoming shipments will arrive in time to address the parts shortage, the logistics provider may use an alternate source for the part. For example, the manufacturer may issue a new purchase order for the parts and expedite shipment of the parts. Once the parts arrive at the consolidation center, the logistics provider needs to arrange to have the parts delivered to the appropriate production line location so that production can continue uninterrupted. Therefore, it is important for the logistics provider to have detailed information about the parts shortage as well as for options to assist in recovering from the shortage.

Although the logistics provider may rely on one or more computer systems to manage many aspects of its parts delivery operations, the computer systems do not provide the features and functionality and detailed information needed to manage parts shortages. In particular, they do not provide features and functionality that allow a logistics provider to project when a parts shortage may occur or the nature of the shortage. There is a need for a computerized system and method provides a logistics provider with detailed information about parts shortages and when they may occur. There is a need for a computerized system and method that allows a logistics provider to receive information about parts shortages so that their impact on production can be analyzed. There is a need for a computerized system and method for determining whether a parts shortage is a critical parts shortage that could have an immediate impact production. There is a need for a computerized system and method that allows a logistics provider to manage parts shortage according to type so that arrangements can be made to avert critical parts shortages.

SUMMARY OF THE INVENTION

A computerized system and method for managing parts shortages furthers a logistics provider's goal of delivering the right part to the right production line location at the right time. In an example embodiment, a consolidation center for receiving parts from suppliers is co-located with an assembly plant. Data for parts received at the consolidation center are stored in an inventory database. Parts are received in trailers that are parked in a yard at the consolidation center. Parts are unloaded from the trailers and stored in various locations at the consolidation center until they are "picked" for delivery to production line locations. The inventory database tracks information about the location of the parts in the consolidation center as well as on the trailers in the yard.

Other databases that are used in the computerized system and method store have part demand data identifying the parts that are needed for production and when they are needed. The computerized system and method analyzes the inventory and production demand data over a period of time to whether the parts in inventory are sufficient to meet production demand. The projections allow the logistics provider to determine when parts shortages are likely to occur. The projections also allow the logistics provider to determine the nature of the potential shortages. Information about the type of parts shortages that may occur as well as information about when they may occur allows the logistics provider to take action to prevent shortages entirely or minimize their impact on production. Some shortages may be covered by requesting delivery of parts from various locations within the site inventory or by locating parts within the site inventory. Other shortages may be covered by ordering more parts from suppliers. The ability to detect various types of shortages and to take corrective or mitigating actions allow a logistics provider to maintain a flow of parts to production. As a result, the logistics provider increases the likelihood that a continuous supply of parts is made available to the associates that facilitate delivery of parts from the consolidation center to the production line.

DETAILED DESCRIPTION

Figure 1:
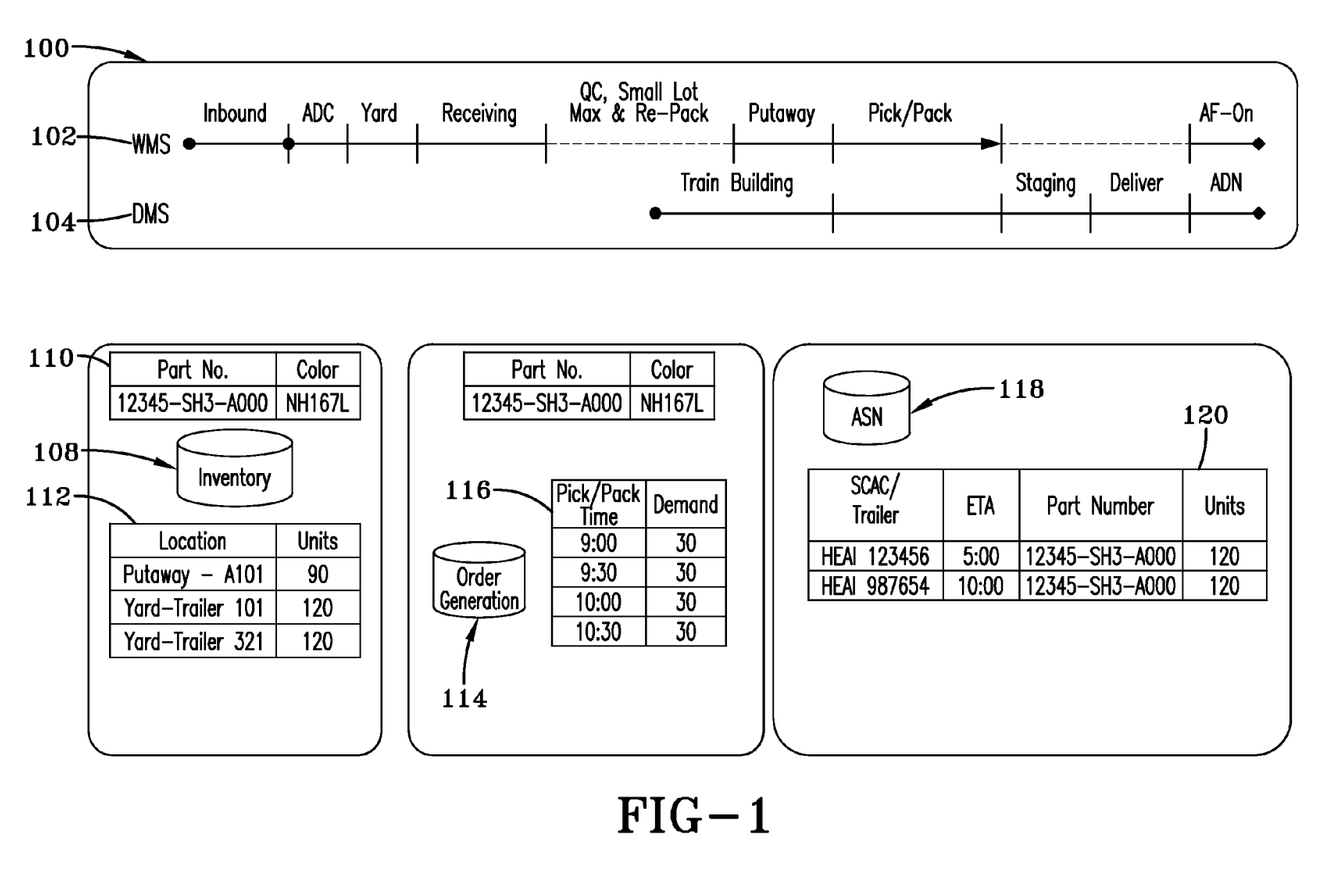
FIG. 1 is a block diagram of a consolidation center inventory and delivery process for an example embodiment.

Referring to FIG. 1, a block diagram of a consolidation center inventory and delivery process for an example embodiment is shown. One or more computer systems 100 may support the inventory and delivery process. A warehouse management system 102 tracks data related to movement of parts throughout the consolidation center as follows:

TABLE 1

Warehouse Management System Data

| Process | Description |
| --- | --- |
| Inbound | Parts arrive (in containers) on inbound trailers. WMS 102 has data for each inbound trailer and the parts loaded in the trailer. |
| ADC | Trailers are processed through an arrival and departure center. |
| Yard | Trailers with parts are temporarily stored in the yard. Each trailer is assigned a location in the yard and each trailer's location in the yard is recorded in WMS 102. |
| QC, Small Lot, Demand Repack, and Repack | Special handling for parts. Certain parts may be inspected or re-packed. |
| Putaway | Containers of parts are stored in delivery inventory areas at the consolidation center to facilitate a pick/pack operation. Each container's location in the consolidation center is recorded in WMS 102. The containers are in an area available to associates completing the pick/pack operations. |
| Pick/Pack | Containers are selected or "picked" from delivery inventory or putaway locations for delivery to the production line. Associates use a computer generated "pick/pack" check sheets that identifies the part containers to load on a cart by or at a specified time. Containers may be loaded on multi-shelf carts that are connected to form a train pulled by a tugger to the production line. |
| AF-On | Parts are delivered line side and then used in assembly operations during the production period. |

A delivery management system 104 tracks data related to the transportation of parts from the consolidation center to the production line as follows:

TABLE 2

Delivery Management System

| Process | Description |
| --- | --- |
| Train Building | Trains comprising a plurality of cart types are assembled throughout the production period and loaded with parts containers that are delivered line side. Trains are reconfigured throughout the production period and parts are delivered when needed to the appropriate production line locations. The delivery management system 104 receives manufacturer production schedule data as well as part and container data to determine which parts are needed and when they are needed. Lead times for delivering parts to different line side locations are determined and used in configuring carts for each train that transports the parts. |
| Pick/Pack | Containers are selected or "picked" for delivery to the production line. Associates use a "pick/pack" check sheets that identifies the part containers to load on a cart by or at a specified time. Containers may be loaded on multi-shelf carts that are connected to form a train that is pulled by a tugger to the production line. |
| Staging | Organize carts and trains for delivery of parts to production line side locations. |
| Deliver | Tuggers pull multi-cart trains to specified production line locations identified on the parts containers. |
| ADN | Parts are delivered line side throughout the production period. |

Data from several sources is used to project parts shortages and to identify actions to prevent or mitigate the impact of shortages. An inventory database 108 comprises location and quantity data 112 for the parts 110 used in production. In the example shown, 120 units of part 12345-SH3-A000: NH167L each are in trailers 101 and 321 in the yard and 90 units of part 12345-SH3-A000: NH167L are in delivery inventory in putaway location A101 for a total of 330 units in consolidation center inventory. An order generation database 114 comprises pick/pack time and demand data 116 for the parts used in production. The pick/pack time and demand data 116 identifies when the specified quantity of parts should be selected from the delivery inventory in putaway locations for delivery to the production line. In the example shown, 30 units of the part are selected for delivery every half hour from 9:00 to 10:30. Finally, an advanced shipping notice (ASN) database 118 comprises information about shipments of parts and their estimated delivery dates and times. The ASN database 118 has identifying information for trailers, estimated times of arrival, part number, and units 120.

The data in the inventory database 108 and order generation database 114 may be used to project when the delivery inventory putaway locations for a part will be depleted and therefore, when parts are needed for the delivery inventory putaway location to maintain the flow of parts to production. For example, if the parts in putaway location A101 (90 units) are applied to the production demand data for the part (30 units at 9:00, 30 units at 9:30, and 30 units at 10:00, 30 units at 10:30), the delivery inventory in putaway location A101 will be depleted at 10:00. Therefore, additional inventory must be provided to delivery inventory before 10:00 for the pick operation to continue after 10:00. The projection information may be used to determine when potential parts shortages will occur and therefore, what actions are needed to ensure that parts continue to be available in the consolidation center delivery inventory to support the pick operation and the flow of parts to production.

Figure 2:
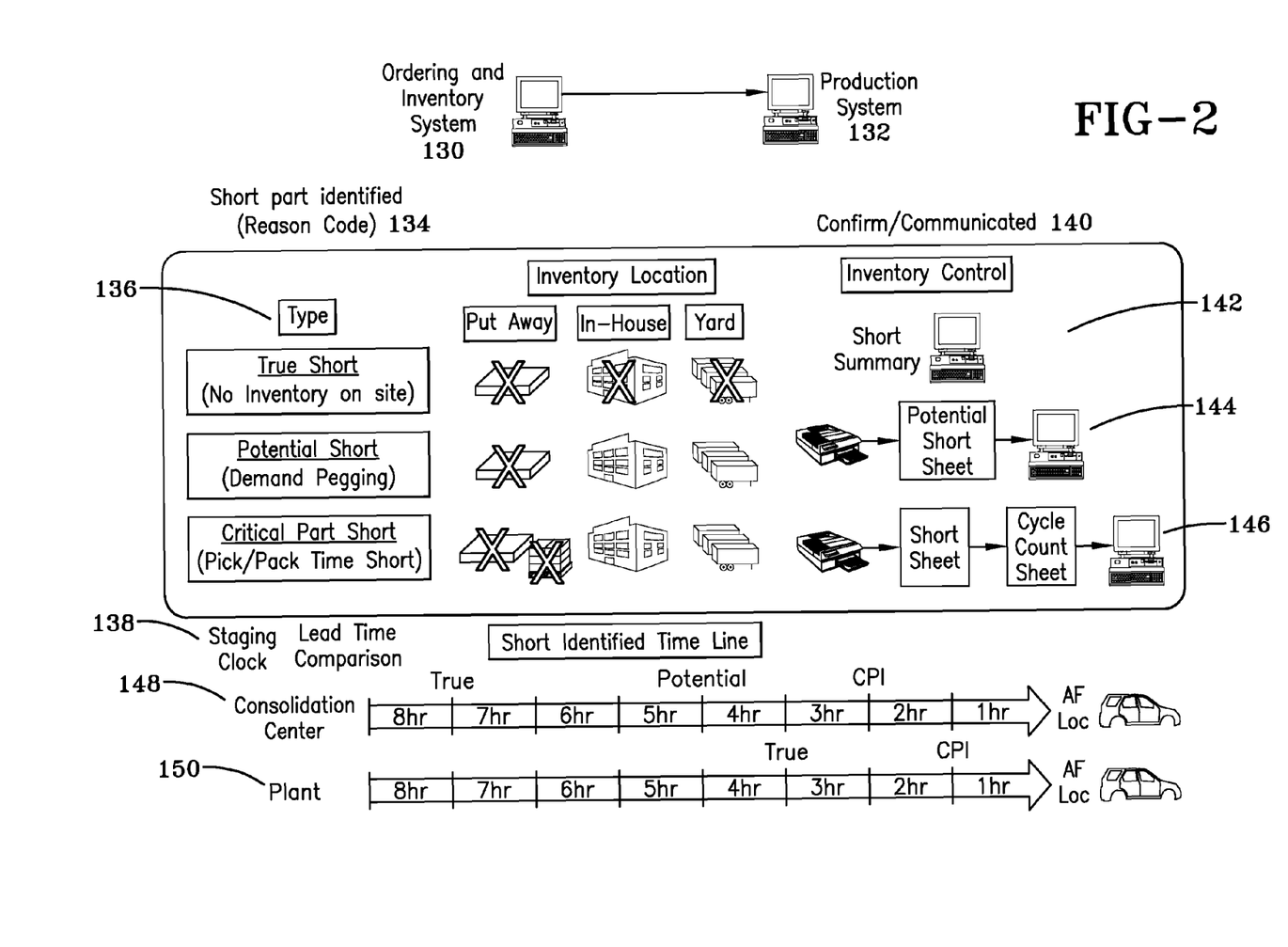
FIG. 2 is a schematic diagram for a short parts management operation for an example embodiment.

Referring to FIG. 2, a schematic diagram for a short parts management operation for an example embodiment is shown. Data from an order generation and inventory computer system 130 is compared against production demand data 132 to determine when delivery inventory for each part may be depleted. Staging clock and lead time comparison data 138 is used to analyze the potential parts shortages that may occur. The results of the comparisons are used to determine a type of parts shortage 136 which is recorded in the computer system 134. Parts may be identified as "short" within the consolidation center 148 or in the assembly plant 150. A "short identified time line" 148, 150 indicates how short types may be determined and assigned. The time line data provides an indication of the amount of time available to the logistics provider to avert the shortage entirely or minimize the impact of the shortage.

TABLE 3

Short Types

| Short Type | Description | Consolidation Center Time Line | Assembly Plant Time Line |
|---|---|---|---|
| True Short | No inventory for part at consolidation center (in putaway locations, in-house (overstock), or in yard) | >4 hours | >2 hours |
| Potential Short | No delivery inventory in putaway locations but inventory available in-house or in yard. Use demand pegging operation to request delivery of part from storage inventory (overstock or yard) so part is available in delivery inventory. | 2-4 hours | |
| Critical Part Short | Pick/Pack Time Short-part missed at point of picking from delivery inventory in putaway location. Part is available from storage inventory (overstock or yard) but must be located. | 1-2 hours | <1 hour |

Once the short type is determined, an inventory control system modification application 142 generates a "short summary" document to assist the logistics provider in determining a possible resolution. For "true short" types, arrangements may be made to order the needed part or parts from a supplier or an alternate source for the part. The logistics provider may arrange to expedite shipment of the part to the consolidation center so that it may be transported directly to delivery inventory in putaway location or to the production line. For "potential short" types, a potential short sheet 144 identifying the needed parts is generated. The potential short sheet is used to monitor a process that is behind schedule in which the parts are requested from storage inventory (e.g., overstock or the trailer yard) to prevent a "critical part short." Process times for transporting parts from the storage inventory (e.g., overstock or the trailer yard) to the delivery inventory in putaway locations are used to determine when the parts from the storage inventory locations should be requested so they are available for picking at the indicated pick/pack time. The request may be added to a task sheet to notify an associate of the need. The associate then arranges to complete the task by the noted time. Finally, for a "critical part short" type, a short sheet and cycle count sheet 146 are generated to facilitate locating the parts in inventory. Once the parts are located, they may be picked for line side delivery.

A user of the inventory control system modification application may review several screens that assist the user in monitoring and viewing information about true, potential, and critical short parts. A receiving schedule identifies the status of trailers that are moved from a yard to receiving docks and unloaded to replenish inventory at the consolidation center. The trailers may be moved from the yard to receiving docks as a result of a demand pegging operation in which parts that are identified as needed in production are selected, transported from the yard to a dock, and unloaded to replenish parts that are needed according to production demand data. The receiving schedule allows a user to monitor the status of the trucks that have been pegged to ensure they are unloaded according to the schedule determined from the demand pegging operation.

TABLE 4

Receiving Schedule

RECEIVING SCHEDULE                                     Jun. 25, 2009 7:39
                                         Wh / CO / DV: XXX XXX XXXXXXXX
Press 1 and Enter to view details

| Opt | Trailer    | Devan Date/Time |       | SCAC | Trailer | Dock | Door | UserID |
|-----|------------|-----------------|-------|------|---------|------|------|--------|
| —   | Inb - Door | 06/23/09        | 7:16  | ABC  | KKX123  | C1   | 001  | UID1   |
| —   | Inb - Door | 06/23/09        | 9:35  | DEF  | COS988  | C1   | 002  | UID2   |
| —   | Inb - Door | 06/23/09        | 9:38  | GHI  | CC101   | C1   | 003  | UID3   |
| —   | Inb - Door | 06/23/09        | 9:21  | ABC  | KKX125  | C1   | 004  |        |
| —   | Inb - Door | 06/23/09        | 9:38  | ABC  | KKX127  | C1   | 005  |        |
| —   | Inb - OnYar| 06/23/09        | 9:48  | JKL  | PMN233  |      |      |        |
| —   | Inb - Door | 06/23/09        | 9:49  | DEF  | COS978  | C1   | 006  |        |
| —   | Inb - Door | 06/23/09        | 9:56  | ABC  | KKX129  | C1   | 007  |        |
| —   | Inb - Door | 06/23/09        | 10:00 | GHI  | UOP009  | C1   | 008  | UID4   |
| —   | Inb - Door | 06/23/09        | 11:14 | DEF  | COS968  | C1   | 009  |        |
| —   | Inb - OnYar| 06/23/09        | 11:15 | ABC  | KKX140  |      |      |        |
| —   | Inb - OnYar| 06/23/09        | 12:05 | DEF  | COS998  |      |      |        |
| —   | Inb - OnYar| 06/23/09        | 12:06 | GHI  | XRT404  |      |      |        |
| —   | Out - Door | 0/00/00         | 00:00 | STR  | DXO887  | C1   | 061  |        |

A user may view details for a shipment by selecting it from the list of shipments in the receiving schedule. The shipment details identify the shipment and its status as well as details regarding the receipt of the shipment (when it was expected and when it arrived) and the number of cases (actually shipped and received).

TABLE 5

Shipment Details

SHIPMENT DETAILS                                       Jun. 25, 2009 7:45
                                         Wh / CO / DV: XXX XXX XXXXXXXX
Press 1 and Enter to view details

| Opt | Shipment | Status      | First Rcpt | Expected Rcpt | Vendor | Cases Shipped | Cases Received |
|-----|----------|-------------|------------|---------------|--------|---------------|----------------|
| —   | 1366     | 40 In Recv  | 06/23      | 06/22         | 0334   | 70            | 65             |
| —   | 5257     | 20 Appt Sche| 00/00      | 06/22         | 0709   | 2             | 0              |
| —   | 2252     | 20 Appt Sche| 00/00      | 06/22         | 0506   | 44            | 0              |
| —   | 0985     | 40 In Recv  | 06/23      | 06/22         | 0928   | 32            | 32             |
| —   | 3847     | 20 Appt Sche| 00/00      | 06/22         | 5678   | 29            | 0              |

A "short parts summary" screen allows a user to view information about short parts. Visual indicators such as bold text and italicized text may be used to quickly communicate information about short parts. Reverse highlighting may be used for individual entries as delivery or pick times approach. The shorts parts summary screen provides the information that allows an associate to prioritize the most critical activity. Information about potential and true shortages allows the associate to take actions to prevent them from becoming critical parts shortages. The screen display is updated as information related to the entries changes.

TABLE 6

Sample Short Parts Summary

SHORT PARTS SUMMARY                                    JUN 25, 2009 9:39
                                         Wh / CO / DV: XXX XXX XXXXXXXX
Press 1 and Enter to view details    Critical Parts (CPI), Potential Short, True Short

| Opt | CTRL #     | Supplier  | Part #         | Color  | Qty    | Lot    | Pick/Train | CST    |
|-----|------------|-----------|----------------|--------|--------|--------|------------|--------|
| —   | C99991     | 99999991  | AOXX1          | CC100  | 30     | 200901 | 06/25      | 10:00  |
|     | ABC Supply |           | Wheel Assembly | St: XX |        |        |            | Cd:X   |
| —   | C99992     | 99999992  | BOXX2          | CC101  | 30     | 200901 | 06/25      | 11:28  |
|     | DEF Supply |           | Trunk Assembly | St:____|        |        |            | Cd:X   |
| —   | C99993     | 99999993  | COXX3          | CC101  | 30     | 200901 | 06/25      | 12:07  |
|     | GHI Supply |           | Visor          | St:____|        |        |            | Cd:X   |
| —   | P99991     | 99999994  | DOXX4          | CC102  | 30     | 200901 | 06/25      | 12:12  |
|     | JKL Supply |           | Door Handle    | St:____|        |        |            | Cd:X   |
| —   | T99992     | 99999995  | EOXX5          | CC103  | 30     | 200901 | 06/25      | 12:16  |

TABLE 6-continued

Sample Short Parts Summary

SHORT PARTS SUMMARY  JUN 25, 2009 9:39
Wh / CO / DV: XXX XXX XXXXXXXX
Press 1 and Enter to view details   Critical Parts (CPI), Potential Short, True Short

| Opt | CTRL # | Supplier | Part # | Color | Qty | Lot | Pick/Train | CST |
|---|---|---|---|---|---|---|---|---|
| — | MNO Supply T99993 PQR Supply | 99999996 | Cover FOXX6 Wheel Cover | CC104 | St: XX 30 St:___ | XXXXX | XX/XX | Cd:X 13:43 Cd:X |

A user may select a details option to get further details about a specific part.

TABLE 7

Short Part Detail

Short Type: Critical Part
Train: TB002205
Part #: AOXX1
Description: Wheel Assembly

| CML | MCID | Quantity | Pick Date | Pick Time | Train Date | Train CST |
|---|---|---|---|---|---|---|
| TMB00220022 |  | 30 | 06/23 | 08:54 | 06/23 | 10:00 |

Figure 3:
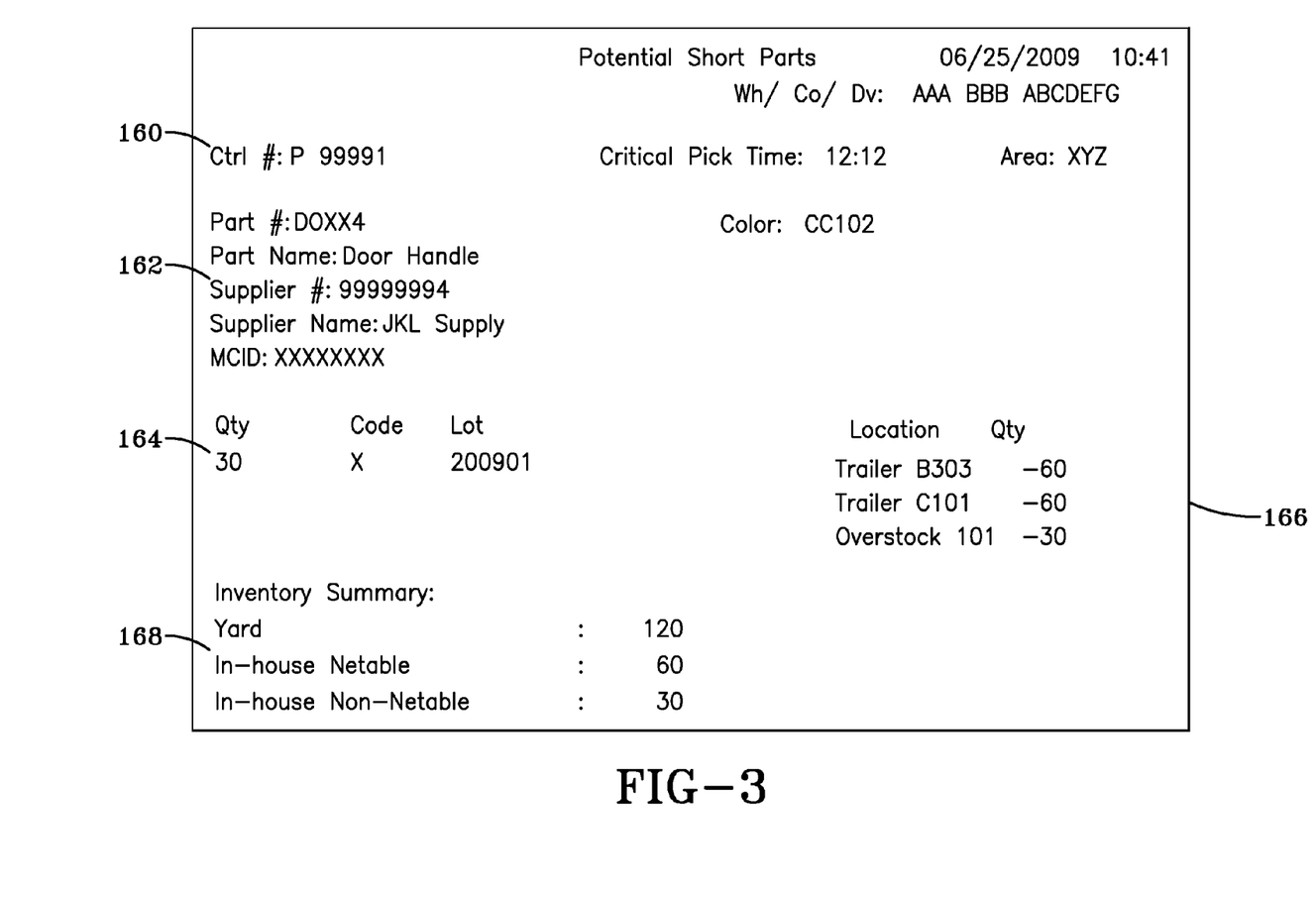
FIG. 3 is a potential short parts sheet for an example embodiment.

Referring to FIG. 3, a potential short parts sheet for an example embodiment is shown. A potential short sheet is generated when the computerized system and method determines that on-site inventory for a particular part is sufficient to meet production demand but is not in delivery inventory in a putaway location and ready to be picked. The potential short parts sheet identifies the potential part shortage by control number 160 and provides information about the part 162. It further provides information about the quantity needed and the production lot for which the part is needed 164. Finally, the potential short sheet provides information about locations in the consolidation center inventory where the part may be located 166. Using the part and location information, an associate can issue a request to obtain the parts from one of the identified locations. The request may result in a task assigned to another associate that is responsible for managing the inventory location. The assigned task may indicate when the identified parts are needed in a delivery inventory putaway location so they are available to be picked at the indicated "critical pick time." An associate may arrange to have the parts transported from the identified location to a delivery inventory putaway location in time to be picked for production. The part identification, pick time, and location data allows the logistics provider to make arrangements to have the parts available when needed. Finally, the potential short parts sheet provides a summary of the total inventory of the part available at the consolidation center 168. In-house nettable parts are parts that meet the manufacturer's quality standards while in-house non-nettable parts may not meet the manufacturer's quality standards or are otherwise suspect.

Figure 4A:
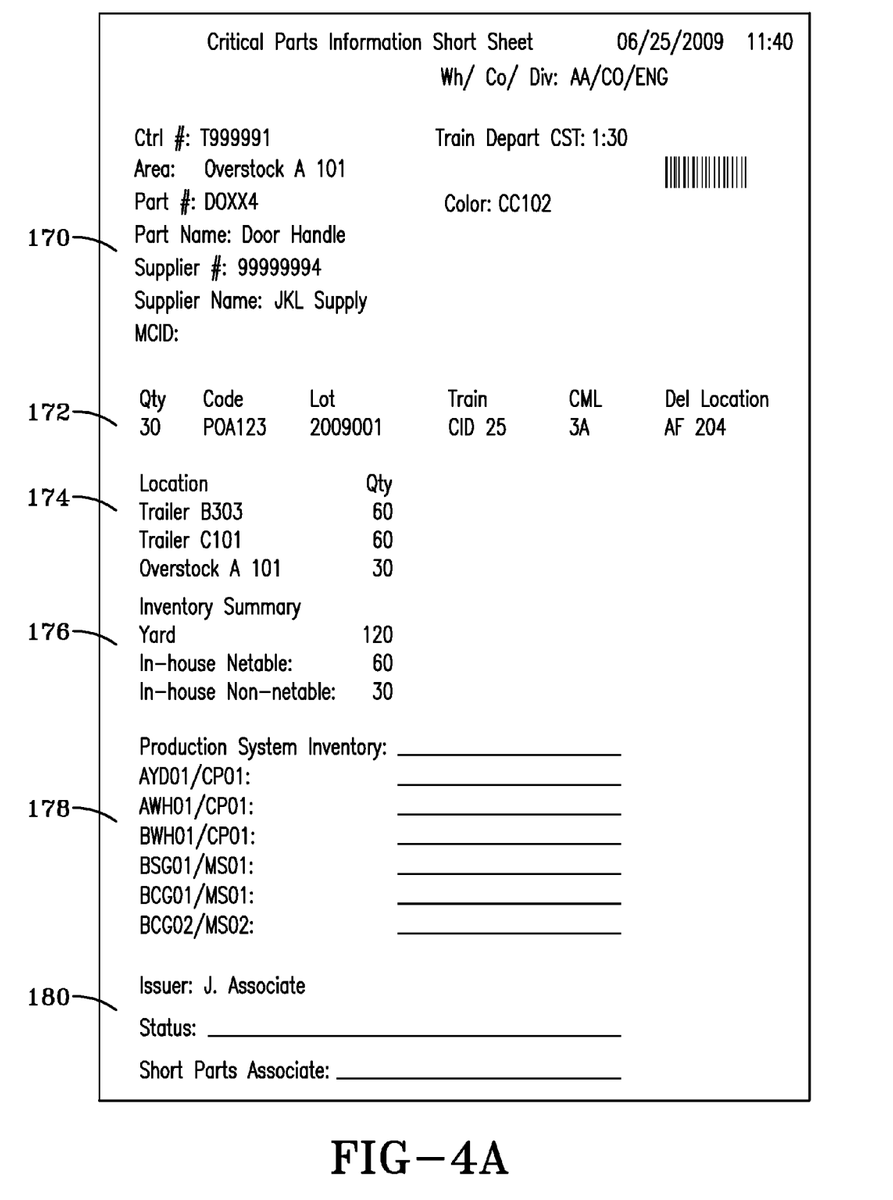
FIGS. 4A and 4B are critical parts data sheets for an example embodiment.
Figure 4B:
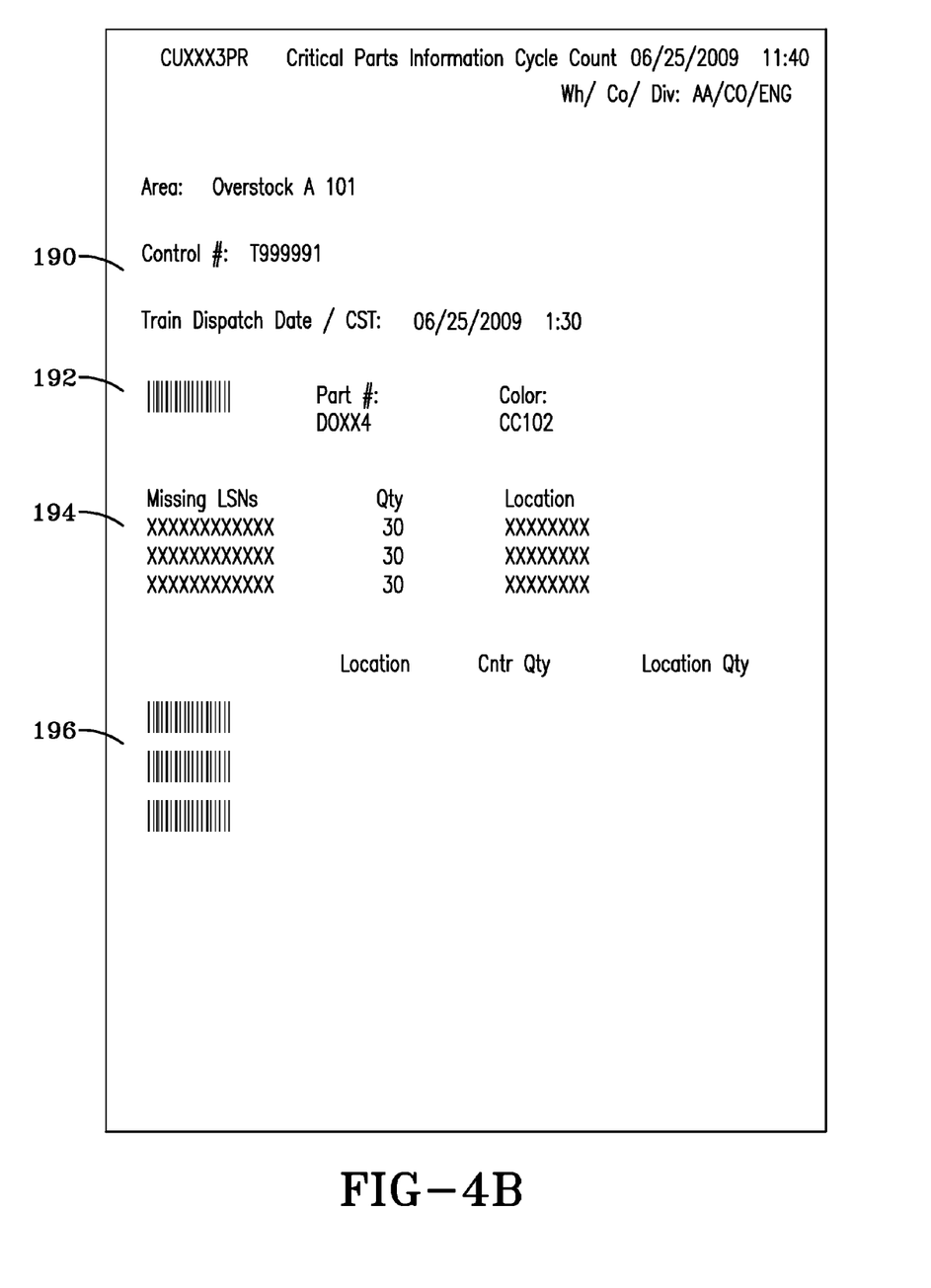

Referring to FIGS. 4A and 4B, critical parts data sheets for an example embodiment are shown. A critical part shortage occurs when the part should be picked but is not available in the delivery inventory putaway location. The critical parts data sheets assist the logistics provider with fulfilling the need for the part identified on the sheet. Referring to FIG. 4A, a critical parts information short sheet for an example embodiment is shown. The sheet identifies the part 170 and delivery data for the part including the quantity needed, the associated lot number, train identifying and cart identifying (cart master label) data for transporting the part, and a production line side delivery location for the part 172. The sheet further identifies on site locations of the part 174 and provides a summary of the total inventory of the part available at the consolidation center 176. The sheet also has a list of specific inventory locations where the part may be located. An associate may check these areas to determine whether the part is available in any of the areas. Finally, the sheet provides administrative details such as an issuer, identifying information for short parts associate that investigates the shortage, and status information 180.

Referring to FIG. 4B, a critical parts information cycle count sheet for an example embodiment is shown. The sheet identifies an inventory area where the part is identified as present 190 and provides detailed part data including a bar code 192. The sheet further specifies inventory areas where the part is identified as missing 194. Finally, the sheet provides a series of tasks 196 that an associate can complete to determine whether there is an inventory discrepancy or the parts were lost during transit.

Figure 5:
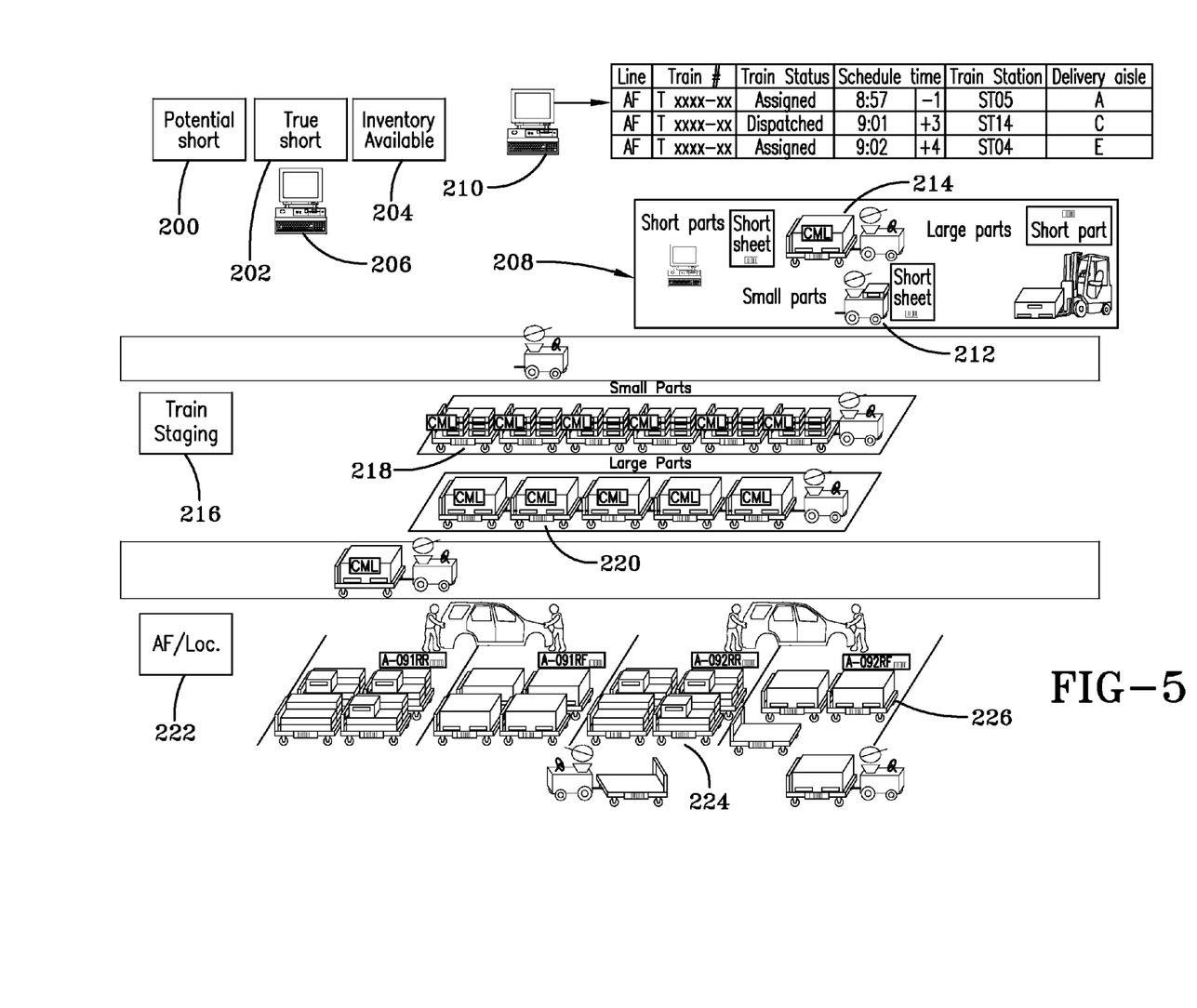
FIG. 5 is a block diagram illustrating a process for delivering parts located as a result of an identified parts shortage for an example embodiment.

Referring to FIG. 5, a block diagram illustrating a process for delivering parts located as a result of an identified parts shortage for an example embodiment is shown. The inventory control system modification application executing at a WMS computer 206 provides directions to an associate for managing the parts shortages. A potential part shortage is resolved when the identified part is located in on-site inventory (e.g., overstock or yard) and transported to delivery inventory in a putaway location in advance of the part pick time. The application then directs the associate to close the potential part shortage record.

When the consolidation center receives the parts associated with a true short, they are transported to a designated short parts area 208 for special handling. For critical part shortages, when the parts are located within the consolidation center inventory, they are also transported the designated short parts area 208 for special handling. The application indicates to an associate where parts will be directed for special handling.

Information regarding the parts shortage is coordinated with information in other computer systems 210 to facilitate the delivery of the parts according to a special handling procedure. The critical short sheet identifies the train number, cart, and line side location for the short part delivery. A train dispatching application displays schedule information for the short parts train that will be dispatched to deliver the parts line side. Different delivery vehicles may be used depending on the size of the parts to be delivered line side. Small parts may be loaded on a shelf of a particular cart attached to a train 212 while large parts may be placed on a cart that is then attached to a train 214.

In the train staging phase 216 of short parts handling for small parts, the parts container is scanned to the cart master label of a cart 218, the part container is loaded on the assigned cart, and the WMS computer is updated to reflect the loading of the parts container on the cart. For large parts, the train and cart are scanned to the cart master label, the cart is attached to the train, and the WMS computer is updated to reflect the attachment of the cart to the train 220.

In the assembly line side delivery phase of short parts handling, if the cart is available in the short parts area 222, the parts container is scanned to a cart master label. The cart is delivered and scanned to the line side delivery location. Once scanning is completed an advanced delivery notice is sent to the WMS computer to reflect the delivery of the parts 224. If the cart is not available, the "critical short parts" control number is scanned to confirm the correct part and quantity for delivery. The parts container is delivered to the line side delivery location and is scanned to a cart master label and then to the delivery line location. Once scanning is completed an advanced delivery notice is sent to the WMS computer to reflect the delivery of the parts 226.

An exemplary embodiment of a computerized system and method for managing parts shortages has been shown and described above. It should be realized by one skilled in the art that various modifications may be made to the computerized system and method described above as well as data items and databases used in the analysis. Changes to the method for determining parts shortages as well as classifying shortages may be made and fall within the scope of the claimed invention. In addition, documents that are generated in relation to identified parts shortages may be modified in various ways and fall within the scope of the claimed invention. Special handling procedures may be modified as well. Therefore, while certain embodiments of the present invention are described in detail above, the scope of the invention is not to be considered limited by such disclosure, and modifications are possible without departing from the spirit of the invention as evidenced by the following claims:

What is claimed is:

1. A computerized method for managing parts shortages for parts delivered to production line locations comprising:
    (a) entering in a computer part identifying data for a part used in production;
    (b) entering in said computer inventory data for inventory of said part, said inventory data comprising:
        (1) units of said part in delivery inventory areas; and
        (2) units of said part in storage inventory areas;
    (c) entering in said computer demand data for said part comprising a plurality of pick times and for each pick time, a number of units;
    (d) calculating at said computer a delivery inventory deplete time by subtracting for each of said plurality of pick times:
        said number of units for said pick time from said number of units in a delivery inventory area;
    (e) determining at said computer whether inventory in said storage inventory areas is available to meet demand for said part at said delivery inventory deplete time; and
    (f) associating said part at said computer with one of a plurality of part shortage types according to whether inventory in said storage inventory areas is available to meet demand for said part at said delivery inventory deplete time.

2. The method of claim 1 further comprising issuing a request to deliver said part from a storage inventory area if inventory in said storage inventory areas is available.

3. The method of claim 2 wherein issuing a request to deliver said part from a storage inventory area comprises issuing a request to deliver said part to a special handling area.

4. The method of claim 1 further comprising issuing a purchase order to a supplier to request delivery of said part to a consolidation center if inventory in said storage inventory areas is not available.

5. The method of claim 4 wherein issuing a purchase order comprises issuing a purchase order to request expedited delivery of said part to said consolidation center.

6. The method of claim 5 further comprising receiving said part at said consolidation center and transporting said part to a special handling area at said consolidation center.

7. The method of claim 1 further comprising associating said part at said computer with another type of part shortage if inventory in said storage inventory areas is indicated in a database as available to meet demand for said part at said delivery inventory deplete time but inventory is not physically available in said storage inventory areas.

8. A computerized system for managing parts shortages for parts delivered to production line locations comprising:
    (a) at least one database for storing:
        (1) part identifying data for a part used in production;
        (2) inventory data for inventory of said part, said inventory data comprising:
            (A) units of said part in delivery inventory areas; and
            (B) units of said part in storage inventory areas;
        (3) demand data for said part comprising a plurality of pick times and for each pick time, a number of units;
    (b) a computer for accessing said at least one database and executing a process to:
        (1) calculate at said computer a delivery inventory deplete time by subtracting for each of said plurality of pick times:
            said number of units for said pick time from said number of units in a delivery inventory area;
        (2) determine at said computer whether inventory in said storage inventory areas is available to meet demand for said part at said delivery inventory deplete time;
        (3) associate said part at said computer with a first type of part shortage if inventory in said storage inventory areas is available to meet demand for said part at said delivery inventory deplete time; and
        (4) associate said part at said computer with a second type of part shortage if inventory in said storage inventory areas is not available to meet demand for said part at said delivery inventory deplete time.

9. The system of claim 8 further comprising a request issued by said computer to deliver said part from a storage inventory area if said part shortage is of said first type.

10. The system of claim 9 wherein said request to deliver said part from a storage inventory area comprises a request to deliver said part to a special handling area.

11. The system of claim 8 further comprising a purchase order issued to a supplier to request delivery of said part to a consolidation center if said part shortage is of said second type.

12. The system of claim 11 wherein said purchase order comprises a request for expedited delivery of said part to said consolidation center.

13. The system of claim 12 further comprising a special handling area at said consolidation center for receiving said part at said consolidation center.

14. The system of claim 8 wherein said process at said computer associates said part at said computer with a third type of part shortage if inventory in said storage inventory areas is indicated in a database as available to meet demand for said part at said delivery inventory deplete time but inventory is not physically available in said storage inventory areas.

15. A computerized method for managing parts shortages for parts delivered to production line locations comprising:
   (a) entering in a computer part identifying data for a part used in production;
   (b) entering in said computer inventory data for inventory of said part, said inventory data comprising:
      (1) units of said part in delivery inventory areas; and
      (2) units of said part in storage inventory areas;
   (c) entering in said computer demand data for said part comprising a plurality of pick times and for each pick time, a number of units;
   (d) calculating at said computer a delivery inventory deplete time by subtracting for each of said plurality of pick times:
      said number of units for said pick time from said number of units in a delivery inventory area;
   (e) determining at said computer whether inventory in said storage inventory areas is available to meet demand for said part at said delivery inventory deplete time;
   (f) associating said part at said computer with a first type of part shortage if inventory in said storage inventory areas is available to meet demand for said part at said delivery inventory deplete time; and
   (g) associating said part at said computer with a second type of part shortage if inventory in said storage inventory areas is not available to meet demand for said part at said delivery inventory deplete time.

16. The method of claim 15 further comprising issuing a request to deliver said part from a storage inventory area if said part shortage is of said first type.

17. The method of claim 16 wherein issuing a request to deliver said part from a storage inventory area comprises issuing a request to deliver said part to a special handling area.

18. The method of claim 15 further comprising issuing a purchase order to a supplier to request delivery of said part to a consolidation center if said part shortage is of said second type.

19. The method of claim 18 wherein issuing a purchase order comprises issuing a purchase order to request expedited delivery of said part to said consolidation center.

20. The method of claim 19 further comprising receiving said part at said consolidation center and transporting said part to a special handling area at said consolidation center.

* * * * *